United States Patent
Kim et al.

(10) Patent No.: US 7,477,339 B2
(45) Date of Patent: Jan. 13, 2009

(54) BACKLIGHT ASSEMBLY HAVING LAMP GUIDE PLATES WITH PLURAL LAMP HOLDERS THEREON IN WHICH THE HOLDERS ARE OFFSET WITH RESPECT TO EACH OTHER

(75) Inventors: Kyoung Sub Kim, Gyeongsangbuk-do (KR); Seok Hwan Oh, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 342 days.

(21) Appl. No.: 11/239,366

(22) Filed: Sep. 30, 2005

(65) Prior Publication Data
US 2006/0066774 A1 Mar. 30, 2006

(30) Foreign Application Priority Data
Sep. 30, 2004 (KR) .................. 10-2004-0077771

(51) Int. Cl.
*G02F 1/1333* (2006.01)
(52) U.S. Cl. .......................................... 349/58; 349/61
(58) Field of Classification Search .................. 349/58, 349/61–64; 362/29, 32–34, 225
See application file for complete search history.

(56) References Cited

U.S. PATENT DOCUMENTS

| | | | | |
|---|---|---|---|---|
| 6,722,773 B2 * | 4/2004 | Tsai et al. | .................... | 362/216 |
| 2005/0206805 A1 * | 9/2005 | Lee et al. | ...................... | 349/64 |
| 2006/0268542 A1 * | 11/2006 | Chen et al. | ................... | 362/225 |

* cited by examiner

Primary Examiner—David Nelms
Assistant Examiner—John S. Heyman
(74) Attorney, Agent, or Firm—Morgan Lewis & Bockius LLP

(57) ABSTRACT

A liquid crystal display device includes a liquid crystal panel including a first substrate, a second substrate, and a liquid crystal layer disposed therebetween; and a backlight assembly including a plurality of lamps disposed in a first direction to provide light to the liquid crystal panel, and a plurality of lamp guides to fix the plurality of lamps, at least one of the lamp guides having a guide plate and a plurality of lamp fixing parts, wherein a first one of the lamp fixing parts is disposed on the guide plate at a lamp fixing part axis in a second direction perpendicular to the first direction, and wherein a second one of the lamp fixing parts is disposed on the guide plate space apart from the lamp fixing part axis.

20 Claims, 5 Drawing Sheets

Central axis

Central axis

Central axis

Central axis

BACKLIGHT ASSEMBLY HAVING LAMP GUIDE PLATES WITH PLURAL LAMP HOLDERS THEREON IN WHICH THE HOLDERS ARE OFFSET WITH RESPECT TO EACH OTHER

This application claims the benefit of Korean Patent Application No. 77771/2004 filed in Korea on Sep. 30, 2004, which is hereby incorporated by reference.

BACKGROUND OF THE INVENTION

1. Field of the Invention

The present invention relates to a backlight assembly and a liquid crystal display device having the same, and more particularly, to a backlight assembly with uniform brightness and a liquid crystal display device having the same.

2. Description of the Related Art

Recently, liquid crystal display (LCD) devices have become smaller and lighter with more powerful performance. While the widely used cathode ray tube (CRT) technology has advantages in performance and price, CRTs have disadvantages in slimness and portability.

In contrast, LCD technology has advantages such as slim profile, light weight and low power consumption, thereby solving the disadvantages of CRT technology. As a result, LCDs are widely used in almost all information processing devices using a display.

Backlight assemblies used for light sources in LCDs can be classified into an edge type backlight assemblies and direct type backlight assemblies according to their cylindrical lamp arrangement. An edge type backlight assembly has a lamp unit installed on the side of a light guide panel for guiding light. The lamp unit includes a lamp to emit light, lamp holders inserted on both sides of the lamp to protect the lamp, and a lamp reflection plate. The lamp reflection plate covers circumferential surface of the lamp with its side inserted on the side of the light guide panel to reflect light from the lamp to the light guide panel.

Accordingly, the edge type backlight assembly having the lamp unit installed on the side(s) of the light guide panel is usually applied to relatively small-sized LCDs, such as monitors of laptop or desktop computers. The edge type backlight assembly has good light uniformity, high durability, and slim profile.

Meanwhile, the direct type backlight assembly has been developed typically for 20-inch LCD displays or larger. Here, a plurality of lamps is aligned on the bottom of a diffusion plate to directly illuminate light on a front side of an LCD panel. The direct type backlight assembly is widely used for a large-sized LCD displays that require high brightness because light utilization of a direct type backlight assembly is higher than that of an edge type backlight assembly.

FIG. 1 is an exploded perspective view of a related art direct type backlight assembly LCD. As shown in FIG. 1, a related art direct type LCD includes a liquid crystal panel 105 and a backlight assembly. The liquid crystal panel 105 includes a bottom substrate with a plurality of pixels arranged in a matrix form, a top substrate with R, G, B color filter layers and a black matrix, and a liquid crystal layer interposed between the top and bottom substrates. The backlight assembly provides light to the liquid crystal panel 105.

The backlight assembly includes a plurality of lamps 113 for emitting light toward the bottom of the liquid crystal panel 105, a lamp holder 111 for fixing the plurality of lamps 113 with a predetermined distance, optical sheets 107, a diffusion plate 108 disposed between the liquid crystal panel 105 and the lamps 113, support frames 110a and 110b for fixing the optical sheets 107 and the diffusion plate 108 at both sides, and a reflection plate 117 disposed on the bottom of the lamps 113. Two lamps 113 form a pair, and each respective pair of lamps 113 is fixed by a lamp guide 109 with a predetermined distance. Additionally, the reflection plate 117 is attached to the inside of a bottom cover 120.

That is, the liquid crystal panel 105, the optical sheet 107, the diffusion plate 108, the support frames 110A and 110B, the lamps 113, and the reflection plate 117 are stacked in the bottom cover 120. Thereafter, a top case 101 is mounted to protect the stacked parts. An inverter 123 for supplying a voltage is mounted on a rear side of the bottom cover 120, and an inverter cover shield 124 is mounted on the inverter 123. A cover shield 121 prevents static electricity.

FIG. 2 is a partial perspective view of the lamps 113 fixed by the lamp guide 109 according to a related art. As shown in FIG. 2, the lamps 113 are mounted on the inside of a bottom cover. The lamps 113 are fixed by a lamp guide 109 in pairs. The lamp guide 109 includes a guide plate 109a and two lamp fixing parts 109b, and each pair of the lamps is respectively fixed by the lamp part 109b. The lamp guide 109 is mounted on the reflection plate 117 in a line and plays a role in holding the lamps when an external impact or vibration is applied.

FIG. 3 is a plan view of a related art lamp guide 109. As shown in FIG. 3, the lamp guide 109 includes the guide plate 109a and the lamp fixing part 109b, and the lamp fixing part 109b is disposed on both edges of the guide plate 109a. More specifically, the lamp fixing part 109b is vertically disposed on a central axis of the guide plate 109a. In the structure of the lamp guide 109, brightness deterioration in a region of the lamp guide 109 does not occur due to characteristics of light such as diffusion, reflection, refraction, and diffraction if there is an enough distance between the lamp and the diffusion plate.

However, as the LCD becomes small-sized, light weight and slim in profile, brightness deterioration occurs in a region of the lamp guide 109 due to a close distance between the lamp and the diffusion plate. Specifically, since brightness deterioration severely occurs in the region of the lamp fixing part 109b, a black line defect appears along with the lamp guide 109. Therefore, the picture quality is deteriorated characterized by a non-uniform brightness over the liquid crystal panel.

SUMMARY OF THE INVENTION

Accordingly, the present invention is directed to a backlight assembly and a liquid crystal display device having the same that substantially obviate one or more problems due to limitations and disadvantages of the related art.

An object of the present invention is to provide a backlight assembly with uniform brightness over an entire region of a liquid crystal display panel by preventing brightness deterioration due to a lamp guide.

Additional features and advantages of the invention will be set forth in part in the description which follows, and in part will be apparent from the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a liquid crystal panel including a first substrate, a second substrate, and a liquid crystal layer disposed therebetween; and a backlight assembly including a plurality of lamps disposed in a first direction to provide light to the liquid crystal panel, and a plurality of lamp guides to fix the plurality of lamps, at least one of the lamp guides having a guide plate and a plurality of lamp fixing parts, wherein a first one of the lamp fixing parts is disposed on the guide plate at a lamp fixing part axis in a second direction perpendicular to the first direction, and wherein a second one of the lamp fixing parts is disposed on the guide plate space apart from the lamp fixing part axis.

In another aspect, a backlight assembly comprises a plurality of lamps; an optical sheet and a diffusion plate disposed on the plurality of lamps; a reflection plate disposed on a side of the plurality of lamps opposite the diffusion plate; and a lamp guide to fix the plurality of lamps, the lamp guide including a guide plate, and a plurality of lamp fixing parts formed on the guide plate such that adjacent lamp fixing parts are shifted with respect to each other in a direction parallel to the orientation of the plurality of lamps.

In another aspect, a backlight assembly comprises a plurality of lamps; an optical sheet and a diffusion plate disposed on the plurality of lamps; a reflection plate disposed on a side of the plurality of lamps opposite the diffusion plate; and a lamp guide having a guide plate slantly disposed at a predetermined angle to fix the plurality of lamps, and a plurality of lamp fixing parts formed on the guide plate.

In another aspect, a liquid crystal display device comprises a liquid crystal panel including a first substrate, a second substrate, and a liquid crystal layer disposed therebetween; and a backlight assembly including a plurality of lamps disposed in a horizontal direction to provide light to the liquid crystal panel, and a plurality of lamp guides to fix the plurality of lamps, each lamp guide having a guide plate and a plurality of lamp fixing parts, wherein adjacent ones of the lamp fixing parts are horizontally shifted with respect to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
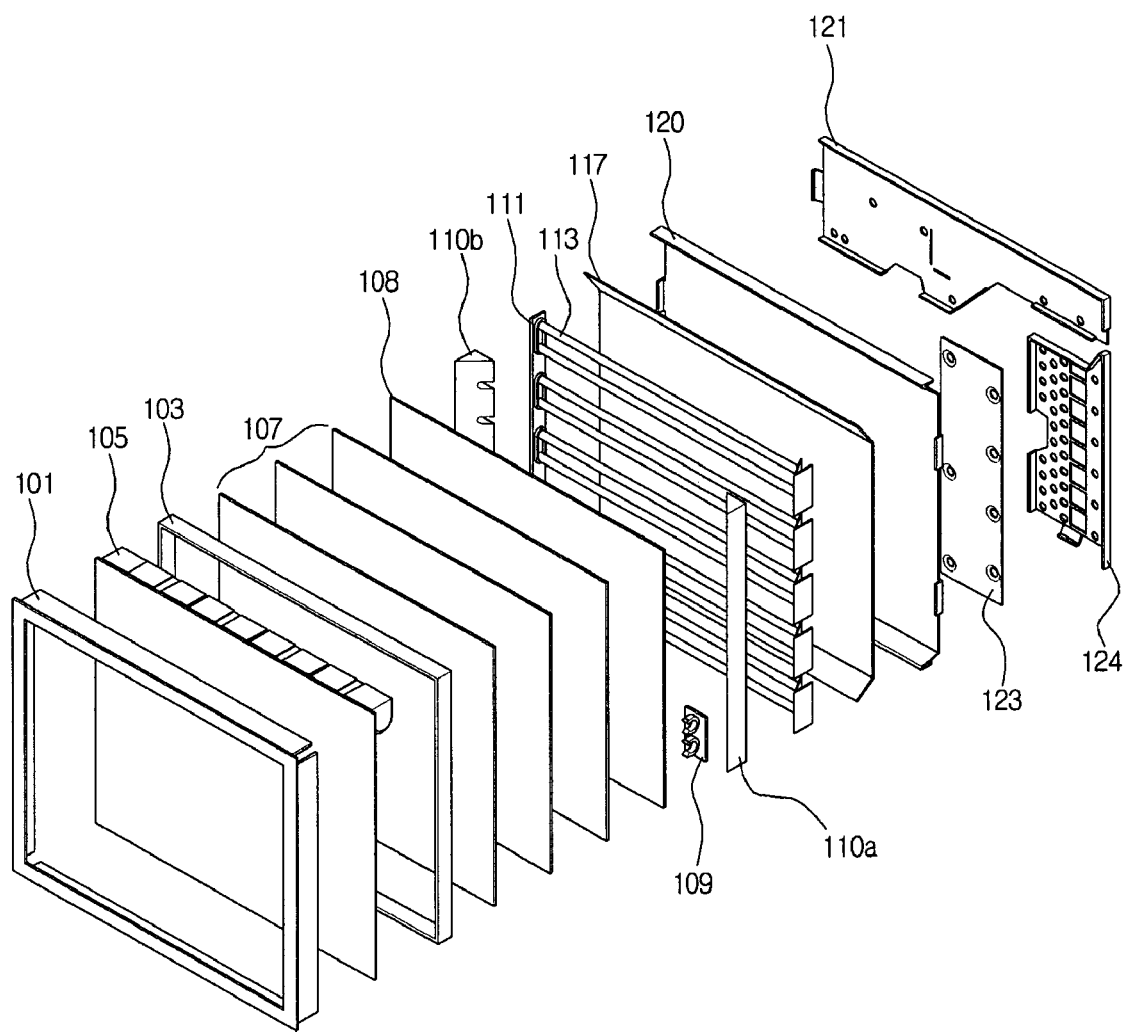
FIG. 1 is an exploded perspective view of a direct type backlight assembly according to the related art.
Figure 2:
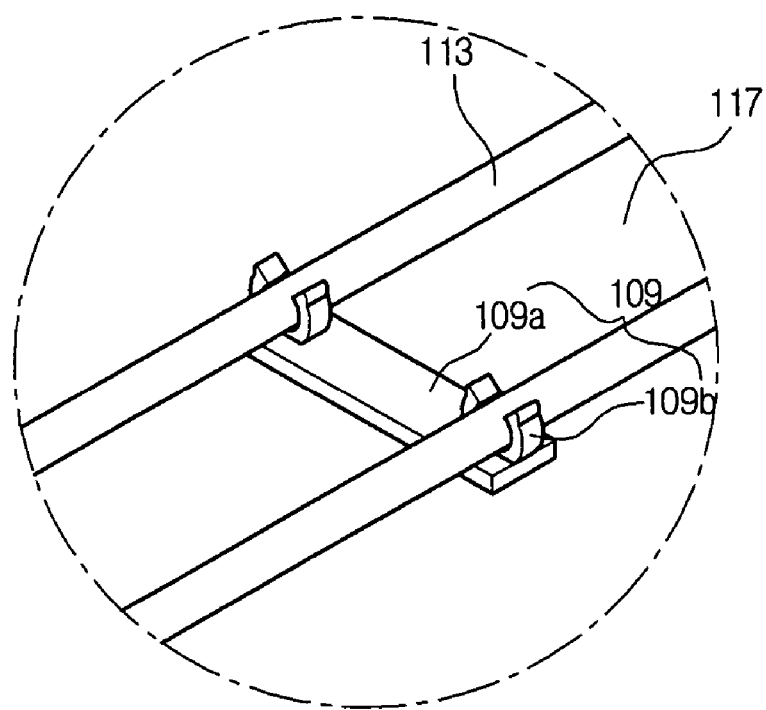
FIG. 2 is a partial perspective view of lamps fixed by a lamp guide according to the related art.
Figure 3:
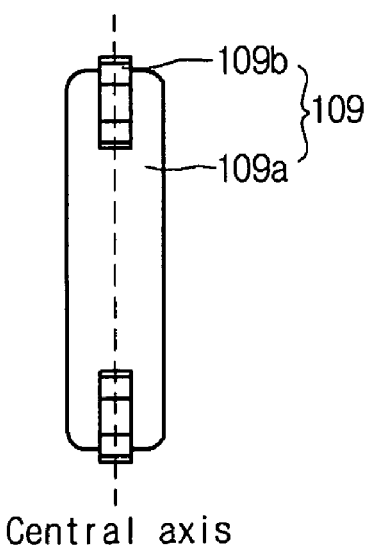
FIG. 3 is a plan view of a lamp guide according to the related art.
Figure 4:
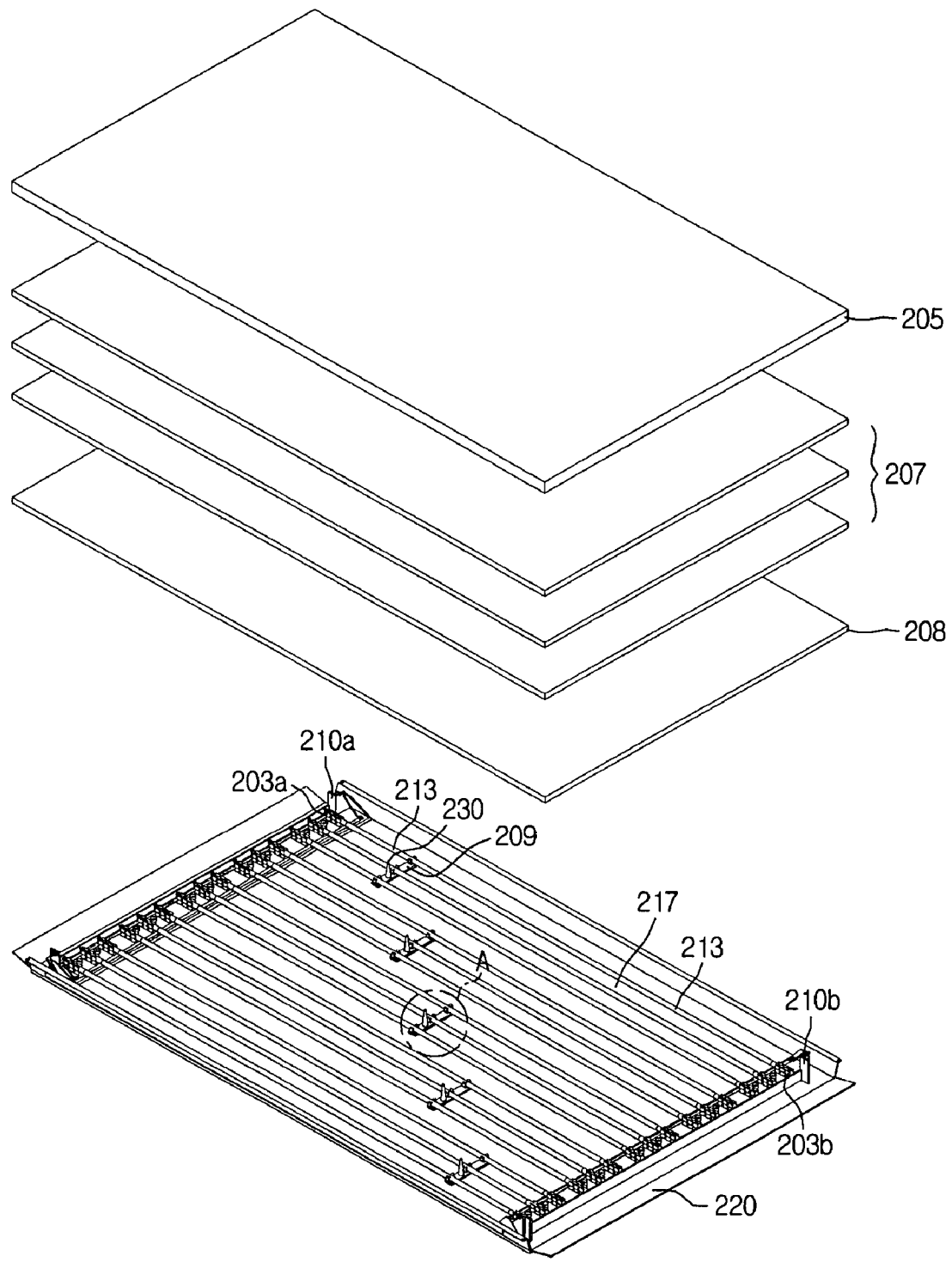
FIG. 4 is a perspective view of a liquid crystal display (LCD) device according to an exemplary embodiment of the present invention.
Figure 5:
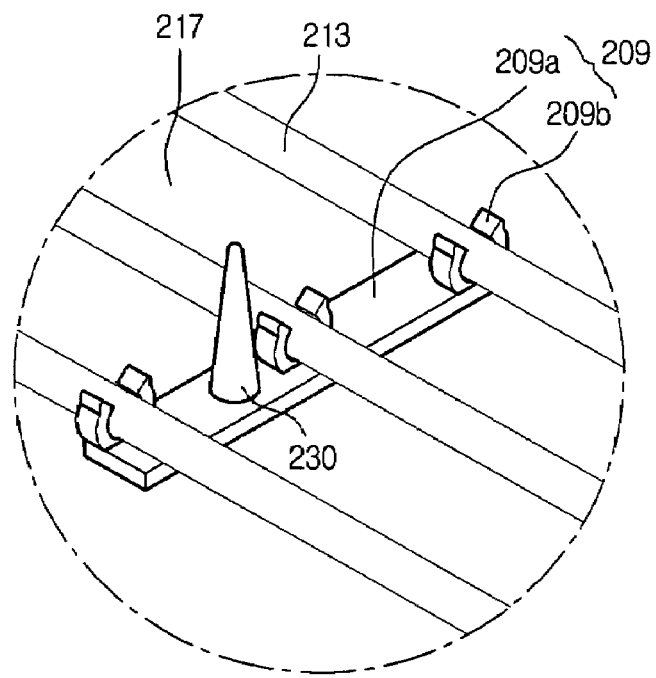
FIG. 5 is an enlarged view of region A in the exemplary LCD device of FIG. 4.

FIG. 4 is a perspective view of a liquid crystal display (LCD) device according to an exemplary embodiment of the present invention, and FIG. 5 is an enlarged view of region in FIG. 4. As shown in FIGS. 4 and 5, the LCD device includes a liquid crystal panel 205 and a backlight assembly. The liquid crystal panel 205 includes a bottom substrate with a plurality of pixels, a top substrate with R, G, B color filter layers, and a liquid crystal layer between the two substrates. A backlight assembly is mounted with a lamp guide 209 to provide light to the liquid crystal panel 205.

The backlight assembly includes a plurality of optical sheets 207, a diffusion plate 208, a plurality of lamps 213, and a reflection plate 217. Here, the reflection plate 217 is mounted on a bottom cover 220, and the lamps 213 are disposed inside the bottom cover 220 at a predetermined distance from the reflection plate 217. The lamps 213 are mounted on power terminals 203a and 203b disposed on the both sides of the bottom cover 220. Additionally, the power terminals 203a and 203b are respectively fixed by support frames 210a and 210b. Moreover, three lamps 213 form a set, and each set of lamps is fixed by a corresponding lamp guide 209. The lamp guide 209 plays an important role in arranging each lamp 231 in a set with an equal distance between the lamps 231.

As shown in FIG. 5, the lamp guide 209 includes a guide plate 209a and three lamp fixing parts 209b on the guide plate 209a. Additionally, a diffusion plate support part 230 is formed projecting from the guide plate 209a, for example, between the lamp fixing parts 209b to maintain the separation between the lamps 213 and the diffusion plate 208. Specifically, the lamp fixing parts 209b are disposed on a left side, a center, and a right side with respect to a central axis of the guide plate 209a. Consequently, the lamp brightness deteriorated by the lamp fixing part 209b is compensated by adjacent lamps 213. Here, more than two lamp fixing parts 209b can be formed on the lamp guide 209.

Figure 6:
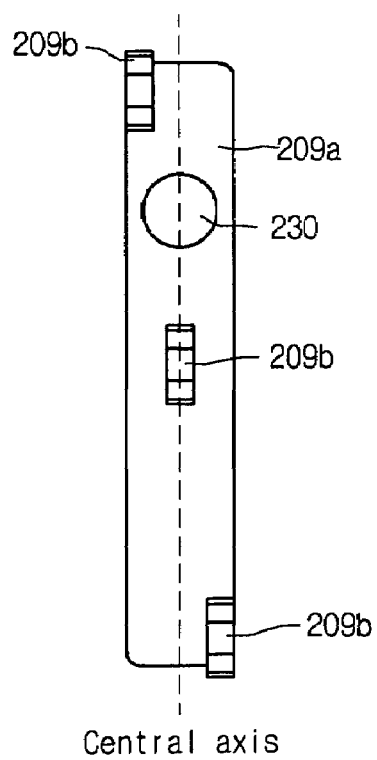
FIG. 6 is a plan view of a lamp guide according to an exemplary embodiment of the present invention.

FIG. 6 is a plan view illustrating a structure of a lamp guide according to an embodiment of the present invention. As shown in FIG. 6, a lamp guide 209 fixing lamps with a predetermined equal distance between the lamps includes three lamp fixing parts 209b on a rectangular guide plate 209a. While three lamp fixing parts 209b are shown, two lamp fixing parts 209b can be formed on the lamp guide 209. Also, more than three lamp fixing parts 209b can be formed on the lamp guide 209.

In FIG. 6, the guide plate 209a is perpendicular to lamps 213 fixed and arranged by the lamp fixing part 209b with an equal distance. The lamp fixing parts 209b on the guide plate 209a are formed on left, middle, and right, respectively, with respect to a central axis perpendicular to the guide plate 209a. Consequently, when light is emitted from lamps fixed by the lamp fixing parts 209b, deterioration of brightness can be substantially prevented in a region of the lamp fixing parts 209b.

As shown in FIG. 6, among the three lamp fixing parts 209b, a middle lamp fixing part 209b is formed on a central axis, and the other lamp fixing parts 209b are formed on a left side and a right side of the central axis, respectively. Alternatively, the middle fixing part 209b can be formed to the left or the right of the central axis, and the other lamp fixing parts 209b can be formed on the central axis.

Accordingly, since the lamp fixing parts 209b of the related art are aligned on the central axis, a brightness deterioration occurs. However, according to the present invention, the brightness deterioration can be prevented because the lamp fixing parts 209b on the lamp guide are formed on the central axis, or a right or a left side of the central axis, respectively.

To prevent brightness deterioration, the lamp fixing parts 209b are formed non-aligned with respect to the central axis of the guide plate 209a. Consequently, the brightness deterioration in a region of the middle lamp fixing part 209b is compensated from adjacent lamps fixed by the other lamp fixing parts 209b. That is, the light from lamps 213 fixed by the off-centered lamp fixing parts 209b are diffused and reflected on a region of the centered lamp fixing parts 209b to compensate for the brightness deterioration. Similarly, the brightness deterioration of the off-centered lamps is compensated by the light from adjacent lamps fixed by the centered lamp fixing part 209b.

In accordance with the present invention, uniform brightness can be obtained without a black line defect because the brightness deterioration caused by the lamp fixing parts 209b of the lamp guide 209 can be compensated from adjacent lamps. Accordingly, the deterioration of the brightness in a dark region where the light is screened by the lamp fixing part 209b can be substantially prevented by applying the lamp guide 209 of the present invention.

Figure 7:
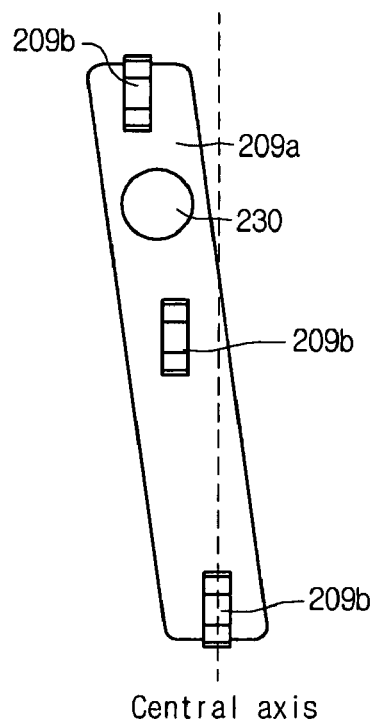
FIGS. 7 and 8 are plan views of a lamp guide according to other exemplary embodiments of the present invention.
Figure 8:
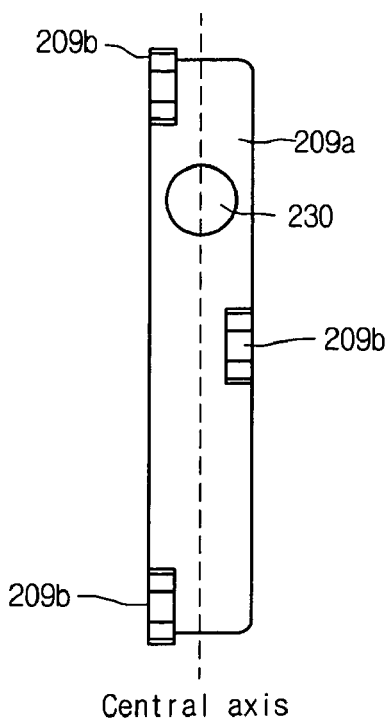

FIGS. 7 and 8 are plan views of a lamp guide according to other exemplary embodiments of the present invention.

Lamp fixing parts 209b are formed in a central region of a lamp guide plate 209a in FIG. 7, but the lamp guide plate 209a is formed with a predetermined angle in relation to a central axis. Consequently, brightness compensation can be obtained from lamps 213 fixed by each lamp fixing part 209b. That is, a central axis is defined parallel to the lamp fixing parts 209b on the guide plate 209a. As such, the lamp fixing parts 209b except the lamp fixing part 209b in the bottom of the guide plate 209a is off-centered with respect to the central axis. However, the central axis is still perpendicular to the lamps fixed by the lamp fixing part 209b.

The brightness deterioration of the lamp fixing part 209b can be substantially prevented by the adjacent lamps because only one lamp fixing part 209b is aligned on the central axis perpendicular to the lamps fixed by the lamp fixing part 209b. That is, uniform brightness can be obtained through a structure in which brightness deterioration caused by the lamp fixing parts 209b can be compensated by adjacent lamps.

More than two lamp fixing parts 209a can be formed on the lamp guide 209 having the guide plate 209a slanted with a predetermined angle. Even though the number of the lamp fixing parts 209b increases, only one lamp fixing part 209b is provided on the central axis so that the brightness compensation can be obtained.

Even though a lamp guide 209 illustrated in FIG. 8 is somewhat similar to that illustrated in FIG. 6, the lamp fixing parts 209b in FIG. 8 are formed not to be on the central axis of the guide plate 209a. In this structure, when the central axis is parallelly displaced, there are two lamp fixing parts 209b on the central axis but brightness deterioration does not occur due to the distance between these two lamp fixing parts 209b as well as the lamp 213 disposed between these two lamp fixing parts 209b.

As described in detail above, brightness deterioration caused from a region of the lamp guide in the backlight assembly can be substantially prevented by changing the positions of the lamp fixing parts on the lamp guide or the structure of the lamp guide. Consequently, uniform brightness can be obtained in the backlight assembly and the liquid crystal display device.

It will be apparent to those skilled in the art that various modifications and variations can be made in the backlight assembly and the liquid crystal display device having the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel including a first substrate, a second substrate, and a liquid crystal layer disposed therebetween; and
   a backlight assembly including a plurality of lamps disposed in a first direction to provide light to the liquid crystal panel, and a plurality of lamp guides to fix the plurality of lamps, at least one of the lamp guides having a guide plate and a plurality of lamp fixing parts, wherein a first one of the lamp fixing parts is disposed on the guide plate at a lamp fixing part axis in a second direction perpendicular to the first direction, and wherein a second one of the lamp fixing parts is disposed on the guide plate space apart from the lamp fixing part axis.

2. The liquid crystal display device according to claim 1, wherein each lamp guide includes two or more lamp fixing parts.

3. The liquid crystal display device according to claim 1, wherein each lamp is fixed by a respective lamp fixing part.

4. The liquid crystal display device according to claim 1, wherein each lamp fixing part has a length perpendicular to the lamps, and the lamp fixing parts of each lamp guide alternately coincides with a central axis parallel to the guide plate.

5. The liquid crystal display device according to claim 1, wherein deterioration of brightness of one of the lamps by a respective lamp fixing part is compensated by adjacent ones of the lamps.

6. The liquid crystal display device according to claim 1, wherein the backlight assembly further includes a diffusion plate, and wherein a support part is formed on each guide plate to support the diffusion plate.

7. The liquid crystal display device according to claim 1, wherein the at least one guide plate is disposed slanted with respect to the lamps such that only one lamp fixing part of the at least one guide plate is disposed at a given axis perpendicular to the lamps.

8. A backlight assembly, comprising:
   a plurality of lamps;
   an optical sheet and a diffusion plate disposed on the plurality of lamps;
   a reflection plate disposed on a side of the plurality of lamps opposite the diffusion plate; and
   a lamp guide to fix the plurality of lamps, the lamp guide including a guide plate, and a plurality of lamp fixing parts formed on the guide plate such that adjacent lamp fixing parts are shifted with respect to each other in a direction parallel to the orientation of the plurality of lamps.

9. The backlight assembly according to claim 8, wherein the lamp guide has three lamp fixing parts.

10. The backlight assembly according to claim 8, wherein each lamp is fixed by a respective lamp fixing part.

11. The backlight assembly according to claim 8, wherein the lamp guide is perpendicular to a respective one of the lamps, and the lamp fixing parts of each lamp guide alternately coincides with a central axis parallel to the guide plate.

12. The backlight assembly according to claim 8, wherein deterioration of brightness of one of the lamps by a respective lamp fixing part is compensated by adjacent ones of the lamps.

13. The backlight assembly according to claim 8, wherein the backlight assembly further includes a diffusion plate, and wherein a support part is formed on the guide plate to support the diffusion plate.

14. A backlight assembly, comprising:

a plurality of lamps;

an optical sheet and a diffusion plate disposed on the plurality of lamps;

a reflection plate disposed on a side of the plurality of lamps opposite the diffusion plate; and a lamp guide having a guide plate slantly disposed at a predetermined angle to fix the plurality of lamps, and a plurality of lamp fixing parts formed on the guide plate.

15. The backlight assembly according to claim 14, wherein the lamp guide has three lamp fixing parts.

16. The backlight assembly according to claim 14, wherein each lamp is fixed by a respective lamp fixing part.

17. The backlight assembly according to claim 14, wherein only one lamp fixing part coincides with an axis perpendicular to the lamps fixed by the lamp fixing part.

18. The backlight assembly according to claim 14, wherein deterioration of brightness of one of the lamps by a respective lamp fixing part is compensated by adjacent ones of the lamps.

19. The backlight assembly according to claim 14, wherein the backlight assembly further includes a diffusion plate, and wherein a support part is formed on the guide plate to support the diffusion plate.

20. A liquid crystal display device, comprising:

a liquid crystal panel including a first substrate, a second substrate, and a liquid crystal layer disposed therebetween; and a backlight assembly including a plurality of lamps disposed in a horizontal direction to provide light to the liquid crystal panel, and a plurality of lamp guides to fix the plurality of lamps, each lamp guide having a guide plate and a plurality of lamp fixing parts, wherein adjacent ones of the lamp fixing parts are horizontally shifted with respect to each other.

* * * * *